United States Patent [19]

Scheel

[11] 4,355,580

[45] Oct. 26, 1982

[54] INEXPENSIVE DRIVERLESS VEHICLE

[75] Inventor: Russell Scheel, Easton, Pa.

[73] Assignee: SI Handling, Inc., Easton, Pa.

[21] Appl. No.: 209,810

[22] Filed: Nov. 24, 1980

[51] Int. Cl.³ .............................................. B61B 13/12
[52] U.S. Cl. ...................................... 104/166; 295/1; 295/34
[58] Field of Search ...................... 104/165, 166, 1 A; 295/31, 33, 4, 8.5, 1, 34

[56] References Cited

U.S. PATENT DOCUMENTS

| 27,978 | 4/1960 | Fox | 104/1 A |
| 3,356,040 | 12/1967 | Fonden | 104/166 X |
| 3,818,837 | 6/1974 | Jacoby | 104/166 |
| 4,036,148 | 7/1977 | Jones et al. | 104/166 |
| 4,036,148 | 7/1977 | Jones | 104/166 |
| 4,059,053 | 11/1977 | Jones | 104/166 |
| 4,132,174 | 1/1979 | Ziefenfus et al. | 104/166 |

Primary Examiner—Richard A. Bertsch
Attorney, Agent, or Firm—Seidel, Gonda, Goldhammer & Panitch

[57] ABSTRACT

A driverless vehicle has an inverted U-shaped body with the bight being a horizontal load supporting surface. A pair of wheels is supported by each leg of the body. A friction drive wheel for contact with a drive shaft is supported by the body. An accumulation bumper is provided adjacent a front end of the body and a cam is supported adjacent the rear end of the body.

10 Claims, 3 Drawing Figures

INEXPENSIVE DRIVERLESS VEHICLE

COMPANION CASE

Reference is made to co-pending application Ser. No. 209,243 filed on Nov. 21, 1980 and entitled "Driverless Vehicle Conveyor System".

BACKGROUND

Driverless vehicles of the general type involved herein are known. For examples of driverless vehicles having a drive wheel for contact with a drive shaft, see U.S. Pat. Nos. 3,818,837; 3,356,040; and 4,036,148.

The present invention is the result of an effort to simplify and reduce the cost of such prior art vehicles. Traditionally, an effort to reduce costs involves use of cheaper materials, use of thinner materials, etc. The present invention does not follow such traditional efforts but instead involves a complete redesign of the vehicle while using a minimum number of components and a minimum of production equipment.

SUMMARY OF THE INVENTION

The driverless vehicle of the present invention has an inverted U-shaped body with the bight being a load supporting surface. A pair of wheels is supported by each leg. A friction drive wheel is supported between the legs. An accumulation bumper projects from a front portion of the body. An accumulation cam is provided adjacent the rear end of the body.

It is an object of the present invention to provide a simple and inexpensive driverless vehicle.

It is another object of the present invention to provide a driverless vehicle which uses a minimum number of components and a minimum of production equipment.

Other objects will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
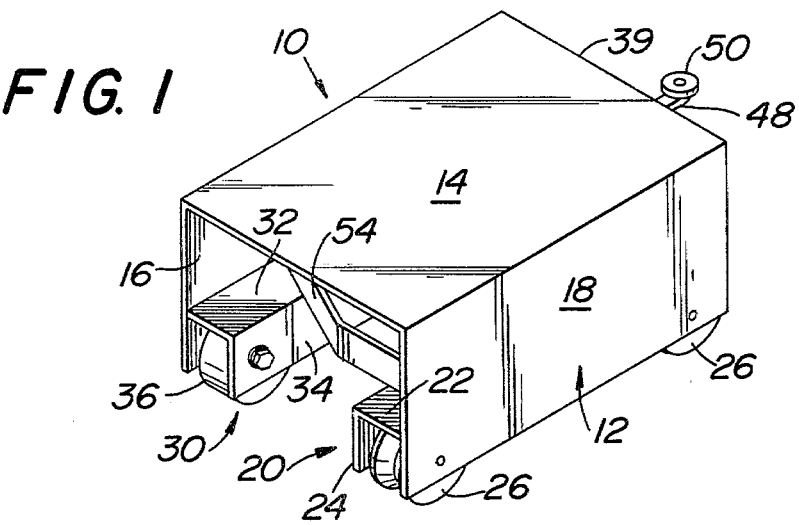
FIG. 1 is a rear perspective view of a vehicle in accordance with the present invention.

Referring to the drawings in detail, wherein like numerals indicate like elements, there is shown in FIG. 1 a driverless vehicle in accordance with the present invention designated generally as 10. The vehicle 10 includes an inverted U-shaped body 12. Body 12 has a horizontally disposed bight 14 and legs 16, 18 depending therefrom.

The body 12 is made from sheet metal such as low carbon steel having a thickness of about 3/16 inch but can be made from other materials. Body 12 may be shaped on a press brake from a flat sheet into the U-shape as shown. Alternatively, body 12 may be extruded in the U-shape as shown and then cut to desired lengths. It will be noted that the width across the bight 14 is preferably greater than the height of the legs 16, 18. The bight 14 is preferably provided with one or more holes to facilitate securement of a jig, fixture or other structure adapted to cooperate with the load and/or position the load in a predetermined location.

An angle member 20 has one leg 22 welded to the leg 12. The other leg 24 is parallel to the wall 12. Legs 12 and 24 rotatably support the axles for a pair of support wheels 26. The pair of wheels 26 preferably have a V-shaped indented peripheral surface for riding on a mating track. The shape of wheels 26 keeps the vehicle 10 in a positive position along its track and enables the wheels 26 to absorb side thrust without the need for track engaging guide wheels.

An angle member 30 has one leg 32 welded to leg 16. The other leg 34 is parallel to the leg 16. Legs 16 and 34 rotatably support the axles for a pair of support wheels 36. The wheels 36 have smooth tread as opposed to the V-shaped tread on wheels 26. Wheels 26 may have a tread the same as the tread on wheels 36 if track engaging guide wheels are provided. The leg 16 has a switch tripping member 28 adjacent the front end 39 of the body 12. Member 38 is utilized to trip a microswitch or the like.

A drive wheel 40 and its support 42 are mounted in any convenient manner between the legs 16 and 18. Support 42 is preferably bolted to the bight 14. Drive wheel 40 is biased to a drive position by a spring 44. Spring 44 extends between the support 42 and the leg 32. Support 42 has a cam follower 46 for contact with a control member adapted to cam the drive wheel 40 and its support to an accumulation position. Drive wheel 40 is adapted to contact a rotatable drive tube as disclosed in the prior art.

Drive wheel 40 is provided with an accumulation bumper 48 terminating in a cam follower 50. Bumper 48 is preferably supported cantilever from the drive wheel support 42. A cam having an angled portion 54 extends between the side walls 16 and 18 of the body 12. The angled portion 54 is located at approximately the same elevation as the cam follower 50.

Figure 2:
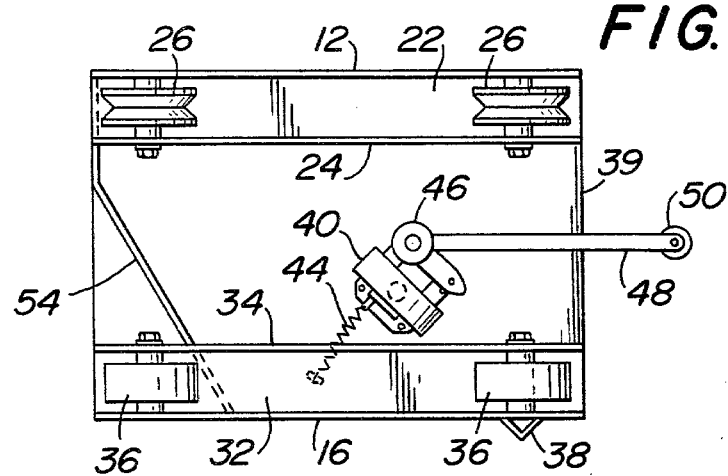
FIG. 2 is a bottom plan view of the vehicle shown in FIG. 1.
Figure 3:
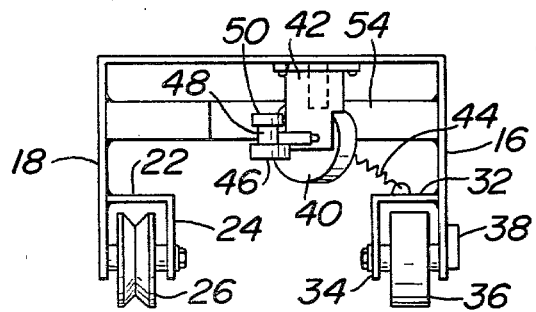
FIG. 3 is a front elevation view of the vehicle shown in FIG. 1.

The vehicle 10 may be used in a variety of different transfer systems but is preferably used in the transfer system of the above-identified co-pending application. One or both sets of wheels 26, 36 may cooperate with a guide track while the drive wheel 40 is in contact with the rotating drive shaft. The drive position of the drive wheel 40 is shown in FIGS. 2 and 3. In the event that vehicle 10 encounters another similar vehicle which has stopped, cam follower 50 will contact the angled portion 54 on the next vehicle in front of it. Such contact will cause the bumper 48, drive wheel 40 and support 42 to rotate about a vertical axis whereby the axis of rotation of drive wheel 40 is parallel to the axis of rotation of the drive tube. When that occurs, the drive wheel 40 and the bumper 40 are in an accumulation position.

The body 12 is made from a U-shaped plate. The wheel supports are accomplished by using one of the legs of the body 12 and commercially available angle iron. The wheels 26, 36 are conventional commercially available wheels. The cam at the rear end of the body 12 is a plain strip of bar stock bent so as to provide the angled portion 54 and welded at its ends to the side walls 16, 18. A minimum of production equipment is needed to construct the vehicle 10 from a minimum number of components. The switch contact member 38 is preferably angle iron having its side edges welded to the side wall 16.

The vehicle 10 is simple in construction, reliable, and yet capable of performing in a sophisticated manner as disclosed in the above-mentioned prior art patents with a load up to 300 lbs.

The present invention may be embodied in other specific forms without departing from the spirit or essential attributes thereof and, accordingly, reference should be made to the appended claims, rather than to the foregoing specification.

I claim:

1. A driverless vehicle comprising an inverted U-shaped metal body with the bight being a horizontal load supporting surface, said body being open at the front and rear end, a pair of wheels supported by each leg of said body, a friction drive wheel supported by said bight between said legs for contact with a drive shaft, an upright support member for said drive wheel, a first cam follower rotatably supported by said upright support member for contact with a control member for moving the drive wheel from its drive position to an accumulation position, means biasing said drive wheel to a drive position, a bumper projecting from the front end of the body and connected to said drive wheel for moving the drive wheel from its drive position to an accumulation position, and a cam disposed between said legs adjacent the rear end of the body for causing a bumper on a similar vehicle to move its drive wheel to an accumulation position, said cam being at an elevation which at least partially overlaps the elevation of a second cam follower on one end of said accumulation bumper.

2. A vehicle in accordance with claim 1 wherein the drive wheel is supported by the bight between said legs and spring biased to a drive position.

3. A vehicle in accordance with claim 1 wherein the tread portion on one pair of wheels is different from the tread portion on the other pair of wheels.

4. A vehicle in accordance with claim 1 wherein said body is a metal body with the width of the bight being greater than the height of the legs on the body.

5. A vehicle in accordance with claim 1 including an angle iron connected to each body leg in a position so as to be disposed beneath the bight, one leg of each angle iron being parallel to and cooperating with one of the body legs to rotatably support the shafts for one of said pairs of wheels.

6. A vehicle in accordance with claim 1 including a switch tripping mechanism secured to an other surface on one of said body legs adjacent the lower end thereof and adjacent the front end of said body.

7. A vehicle in accordance with claim 1 wherein said means biasing the drive wheel to a drive position includes a spring having one end connected to said upright support member.

8. A vehicle in accordance with claim 1 wherein said body is a one-piece metal body with the width of the bight being greater than the height of the legs on the body, a discrete angle iron connected to each body leg adjacent a lower end thereof, one leg of each angle iron being parallel to and cooperating with its associated body leg to rotatably support the shafts for the pair of wheels supported by its associated body leg.

9. A vehicle in accordance with claim 1 wherein the first cam follower is disposed below the elevation of said second cam follower and said cam.

10. A driverless vehicle comprising an inverted U-shaped body with the bight being a horizontal load supporting surface, a pair of wheels supported by each leg of said body, each leg being generally perpendicular to said bight, a friction drive wheel on said body for contact with a drive shaft, a bumper having a free end projecting from a front end of the body and connected to said drive wheel for moving the drive wheel from a drive position to an accumulation position, and a cam transversely disposed adjacent the rear end of said body for causing a bumper on another vehicle to move its drive wheel to an accumulation position, said cam being supported at its ends by said legs, said cam and bumper free end being at substantially the same elevation.

* * * * *